United States Patent
Okabe et al.

(10) Patent No.: US 11,842,741 B2
(45) Date of Patent: Dec. 12, 2023

(54) SIGNAL PROCESSING SYSTEM, SIGNAL PROCESSING DEVICE, SIGNAL PROCESSING METHOD, AND RECORDING MEDIUM

(71) Applicant: NEC Corporation, Tokyo (JP)

(72) Inventors: Koji Okabe, Tokyo (JP); Takafumi Koshinaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 645 days.

(21) Appl. No.: 16/976,600

(22) PCT Filed: Mar. 13, 2019

(86) PCT No.: PCT/JP2019/010174
§ 371 (c)(1),
(2) Date: Aug. 28, 2020

(87) PCT Pub. No.: WO2019/176986
PCT Pub. Date: Sep. 19, 2019

(65) Prior Publication Data
US 2021/0050021 A1 Feb. 18, 2021

(30) Foreign Application Priority Data
Mar. 15, 2018 (JP) .................................. 2018-048419

(51) Int. Cl.
*G10L 17/18* (2013.01)
*G06N 3/04* (2023.01)
(Continued)

(52) U.S. Cl.
CPC ................ *G10L 17/18* (2013.01); *G06N 3/04* (2013.01); *G06N 3/045* (2023.01); *G10L 17/02* (2013.01); *G06N 3/084* (2013.01)

(58) Field of Classification Search
CPC ........... G10L 17/18; G10L 17/02; G06N 3/04; G06N 3/045; G06N 3/084
(Continued)

(56) References Cited

U.S. PATENT DOCUMENTS 10,176,811 B2* 1/2019 Xue ..................... G10L 15/07
10,679,612 B2* 6/2020 Lee ..................... G10L 21/038
(Continued)

FOREIGN PATENT DOCUMENTS

| JP | 2004-139049 A | 5/2004 |
| JP | 2006-287319 A | 10/2006 |

(Continued)

OTHER PUBLICATIONS

Snyder, David, et al. "Deep neural network embeddings for text-independent speaker verification." Interspeech. vol. 2017. 2017.*
(Continued)

*Primary Examiner* — Edwin S Leland, III

(57) ABSTRACT

A feature vector having high class identification capability is generated. A signal processing system provided with: a first generation unit for generating a first feature vector on the basis of one of time-series voice data, meteorological data, sensor data, and text data, or on the basis of a feature quantity of one of these; a weight calculation unit for calculating a weight for the first feature vector; a statistical amount calculation unit for calculating a weighted average vector and a weighted high-order statistical vector of second or higher order using the first feature vector and the weight; and a second generation unit for generating a second feature vector using the weighted high-order statistical vector.

7 Claims, 5 Drawing Sheets

(51) Int. Cl.
  *G10L 17/02* (2013.01)
  *G06N 3/045* (2023.01)
  *G06N 3/084* (2023.01)

(58) Field of Classification Search
  USPC .......................................................... 704/232
  See application file for complete search history.

(56) References Cited

U.S. PATENT DOCUMENTS

| | | | |
|---|---|---|---|
| 2009/0171660 A1* | 7/2009 | Jian .................... | G10L 17/20 |
| | | | 704/E17.001 |
| 2012/0004887 A1* | 1/2012 | Kawaguchi ............ | G06V 40/28 |
| | | | 702/150 |
| 2012/0237042 A1* | 9/2012 | Hirohata ................ | G10L 25/78 |
| | | | 381/56 |
| 2016/0098993 A1 | 4/2016 | Yamamoto et al. | |
| 2016/0118039 A1* | 4/2016 | Moon .................... | G10L 15/08 |
| | | | 704/239 |
| 2017/0358306 A1* | 12/2017 | Xue ...................... | G10L 17/18 |
| 2018/0040323 A1* | 2/2018 | Lesso ................... | G10L 25/90 |
| 2018/0190268 A1* | 7/2018 | Lee ....................... | G10L 15/02 |

FOREIGN PATENT DOCUMENTS

| | | |
|---|---|---|
| JP | 2009-151305 A | 7/2009 |
| JP | 2016-075740 A | 5/2016 |
| JP | 2017-535809 A | 11/2017 |
| WO | 2011/033597 A1 | 3/2011 |
| WO | 2011/077696 A1 | 6/2011 |
| WO | 2011/077924 A1 | 6/2011 |

OTHER PUBLICATIONS

JP Office Action for JP Application No. 2021-165174, dated Sep. 27, 2022 with English Translation.
International Search Report for PCT Application No. PCT/JP2019/010174, dated Jun. 18, 2019.
English translation of Written opinion for PCT Application No. PCT/JP2019/010174, dated Jun. 18, 2019.
David Snyder, Daniel Garcia-Romero, Daniel Povey, Sanjeev Khudanpur, Deep Neural Network Embeddings for Text-Independent Speaker Verification, INTERSPEECH2017 (Aug. 24, 2017), pp. 999 to 1003, particularly line 13 in left field on p. 1000 to line 23 in left field on p. 1001, and Fig. 1, Sweden.

* cited by examiner

SIGNAL PROCESSING SYSTEM, SIGNAL PROCESSING DEVICE, SIGNAL PROCESSING METHOD, AND RECORDING MEDIUM

This application is a National Stage Entry of PCT/JP2019/010174 filed on Mar. 13, 2019, which claims priority from Japanese Patent Application 2018-048419 filed on Mar. 15, 2018, the contents of all of which are incorporated herein by reference, in their entirety.

TECHNICAL FIELD

The present invention relates to a signal processing system, a signal processing device, a signal processing method, and a recording medium.

BACKGROUND ART

PTLs 1 and 2 disclose a technique for extracting, by analyzing a time-series signal related to a content such as a video or music, a feature of a voice included in the content.

There is a case where deep learning is used in speaker recognition using a speaker's voice. For example, NPL 1 generates a short-time feature vector, and an average vector and a standard deviation vector of the short-time feature vector. NPL 1 generates a feature vector having high speaker recognition capability by generating a long-time feature vector from the average vector and the standard deviation vector.

CITATION LIST

Patent Literature

[PTL 1] International Publication No. WO2011/077696
[PTL 2] Japanese Unexamined Patent Application Publication No. 2006-287319
[PTL 3] International Publication No. WO2011/033597

Non Patent Literature

[NPL 1] David Snyder, Daniel Garcia-Romero, Daniel Povey, Sanjeev Khudanpur, Deep Neural Network Embeddings for Text-Independent Speaker Verification, INTERSPEECH2017 (Aug. 24, 2017)

SUMMARY OF INVENTION

Technical Problem

However, in NPL 1, for example, in a case of being used for long-time voice data, even though certainty of a feature of a speaker varies from frame to frame, a statistical amount is calculated by weighting all frames equally. Therefore it may not be possible to generate a feature vector having high capability of recognizing a class such as a speaker.

An object of the present invention is to provide a signal processing system, a signal processing device, a signal processing method, and a recording medium that solve the above-described problem.

Solution to Problem

A first aspect of the present invention is a signal processing system including: a first generation unit for generating a first feature vector based on any one of pieces of time-series voice data, weather data, sensor data, and text data, or a feature amount of any one of pieces of the data; a weight calculation unit for calculating a weight for the first feature vector; a statistical amount calculation unit for calculating a weighted average vector and a weighted high-order statistical vector of second order or higher by using the first feature vector and the weight; and a second generation unit for generating a second feature vector by using the weighted high-order statistical vector.

A second aspect of the present invention is a signal processing device including: a first generation unit for generating a first feature vector based on any one of pieces of time-series voice data, weather data, sensor data, and text data, or a feature amount of any one of pieces of the data; a weight calculation unit for calculating a weight for the first feature vector; a statistical amount calculation unit for calculating a weighted average vector and a weighted high-order statistical vector of second order or higher by using the first feature vector and the weight; and a second generation unit for generating a second feature vector by using the weighted high-order statistical vector.

A third aspect of the present invention is a signal processing method including by a computer: a statistical amount calculation process of generating a first feature vector based on any one of pieces of time-series voice data, weather data, sensor data, and text data, or a feature amount of any one of pieces of the data, calculating a weight for the first feature vector, and calculating a weighted average vector and a weighted high-order statistical vector of second order or higher by using the first feature vector and the weight; and generating a second feature vector by using the weighted high-order statistical vector.

A fourth aspect of the present invention is a non-transitory recording medium storing a program for causing a computer to execute: a first generation step of generating a first feature vector based on any one of pieces of time-series voice data, weather data, sensor data, and text data, or a feature amount of any one of pieces of the data; a weight calculation step of calculating a weight for the first feature vector; a statistical amount calculation step of calculating a weighted average vector and a weighted high-order statistical vector of second order or higher by using the first feature vector and the weight; and a second generation step of generating a second feature vector by using the weighted high-order statistical vector.

Advantageous Effects of Invention

According to one aspect of the present invention, a feature vector having high class-recognition capability can be generated.

EXAMPLE EMBODIMENT

In the following, an example embodiment of the present invention is described with reference to the drawings.

First Example Embodiment

Figure 1:
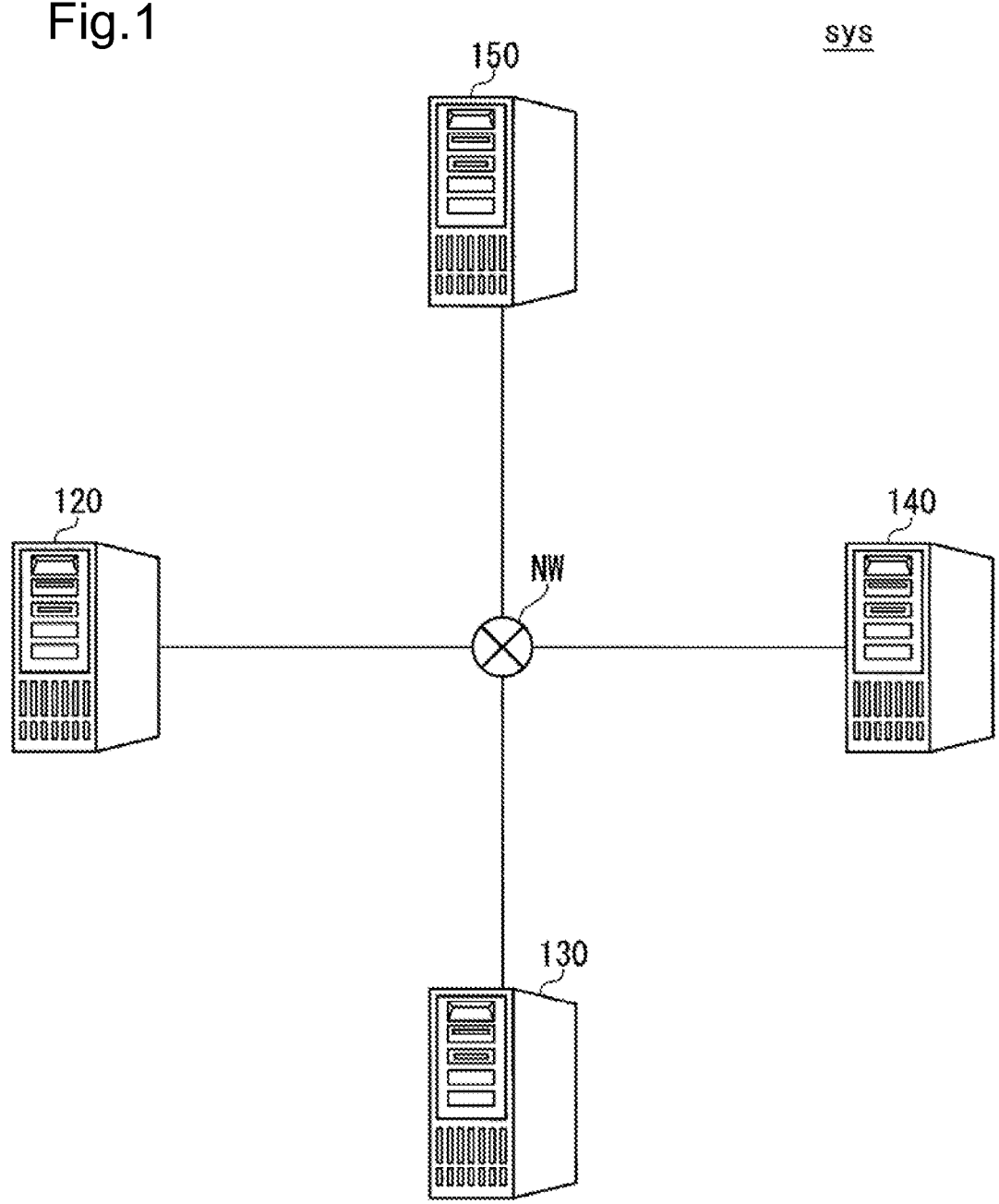
FIG. 1 is a system configuration diagram illustrating one example of a configuration of a signal processing system according to a first example embodiment.

FIG. 1 is a system configuration diagram illustrating one example of a configuration of a signal processing system sys according to a first example embodiment.

The signal processing system sys is configured in such a way as to include a first generation device 120, a second generation device 130, a weight calculation device 140, and a statistical amount calculation device 150. The first generation device 120, the second generation device 130, the weight calculation device 140, and the statistical amount calculation device 150 are connected to each other via a network NW.

For example, each of the first generation device 120, the second generation device 130, the weight calculation device 140, and the statistical amount calculation device 150 is configured by a neural network.

When voice data of a person's voice and the like or a feature amount of a person's voice and the like are input, the first generation device 120 generates a first feature vector. Specifically, when voice data or a feature amount are input, first generation device 120 generates a first feature vector, that is, a short-time feature vector, for each predetermined time (frame).

The weight calculation device 140 calculates a weight for each first feature vector generated by the first generation device 120 for each predetermined time (frame). For example, when a matrix in which short-time feature vectors for a plurality of frames are arranged is input from the first generation device 120 as a first feature vector for each predetermined time, the weight calculation device 140 calculates a weight for each frame (first feature vector).

The statistical amount calculation device 150 calculates a weighted average vector and a weighted high-order statistical vector of second order or higher by using the first feature vector generated by the first generation device 120 and the weight calculated by the weight calculation device 140. Specifically, for example, when a matrix in which short-time feature vectors for a plurality of frames are arranged and a weight are input as a first feature vector for each predetermined time, the statistical amount calculation device 150 calculates a weighted average vector and a weighted standard deviation vector.

The second generation device 130 generates a second feature vector by using the weighted high-order statistical vector calculated by the statistical amount calculation device 150. Specifically, when a weighted average vector and a weighted standard deviation vector are input, the second generation device 130 generates, as a second feature vector, a long-time feature vector of a fixed dimensional number.

A signal processing system is capable of recognizing (identifying) a speaker (class) of voice data by using a long-time feature vector generated as a second feature vector.

In the above description, one example of a case is described in which each of the first generation device 120, the second generation device 130, the weight calculation device 140, and the statistical amount calculation device 150 is configured by a neural network, and configured as a separate device. In the following description, one example of a case is described in which the first generation device 120, the second generation device 130, the weight calculation device 140, and the statistical amount calculation device 150, are respectively assumed to be a first generation unit 121, a second generation unit 131, a weight calculation unit 141, and a statistical amount calculation unit 151, and those units function as a signal processing device 1. The first generation unit 121 is one example of a first generation means. The second generation unit 131 is one example of a second generation means. The weight calculation unit 141 is one example of a weight calculation means. The statistical amount calculation unit 151 is one example of a statistical amount calculation means.

Figure 2:
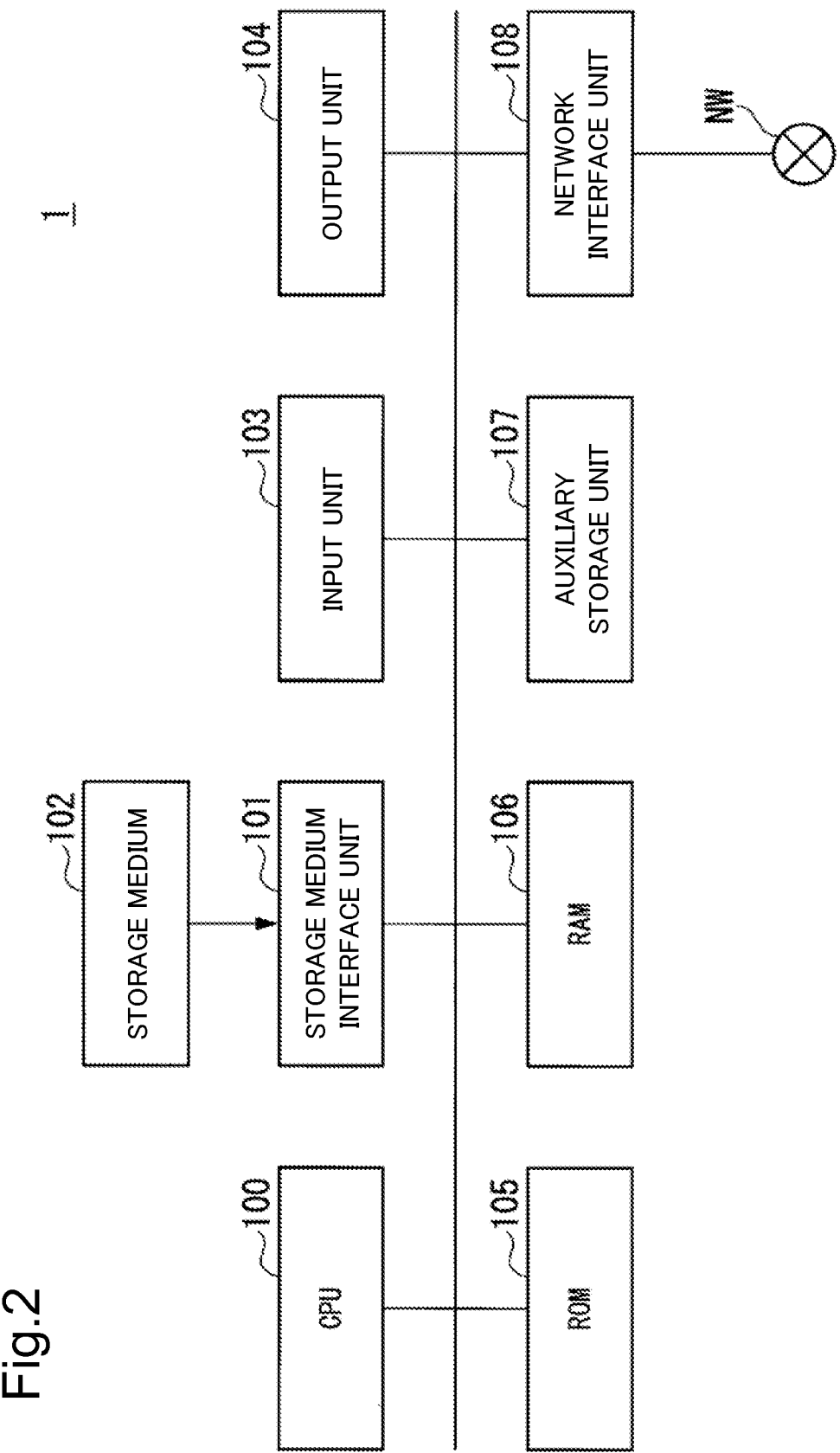
FIG. 2 is a schematic block diagram illustrating one example of a hardware configuration of a signal processing device according to the first example embodiment.

FIG. 2 is a schematic block diagram illustrating one example of a hardware configuration of the signal processing device 1 according to the first example embodiment.

The signal processing device 1 includes a CPU 100, a storage medium interface unit 101, a storage medium 102, an input unit 103, an output unit 104, a read only memory (ROM) 105, a random access memory (RAM) 106, an auxiliary storage unit 107, and a network interface unit 108. The CPU 100, the storage medium interface unit 101, the input unit 103, the output unit 104, the ROM 105, the RAM 106, the auxiliary storage unit 107, and the network interface unit 108 are connected to each other via a bus.

The CPU 100 reads and executes a program stored in the auxiliary storage unit 107 and various data stored in the ROM 105 and the RAM 106, and thereby controls the signal processing device 1. Further, the CPU 100 reads and executes, via the storage medium interface unit 101, various data stored in the storage medium 102, and thereby controls the signal processing device 1. The storage medium 102 is a portable storage medium such as a magneto-optical disk, a flexible disk, or a flash memory, and stores various data.

The storage medium interface unit 101 is a readout device for the storage medium 102, such as an optical disk drive or a flexible disk drive.

The input unit 103 is an input device such as a mouse, a keyboard, or a touch panel.

The output unit 104 is an output device such as a display unit or a speaker.

The ROM 105 and the RAM 106 store various data.

The auxiliary storage unit 107 is a hard disk drive, a flash memory, or the like, and stores a program for operating each functional unit of the signal processing device 1, and various data.

The network interface unit 108 includes a communication interface, and is connected to the network NW by a wired connection or a wireless connection.

For example, a control unit 110, a reception unit 160, and a presentation unit 170 in a software configuration of the signal processing device 1 in FIG. 3 described later are relevant to the CPU 100 in FIG. 2.

Figure 3:
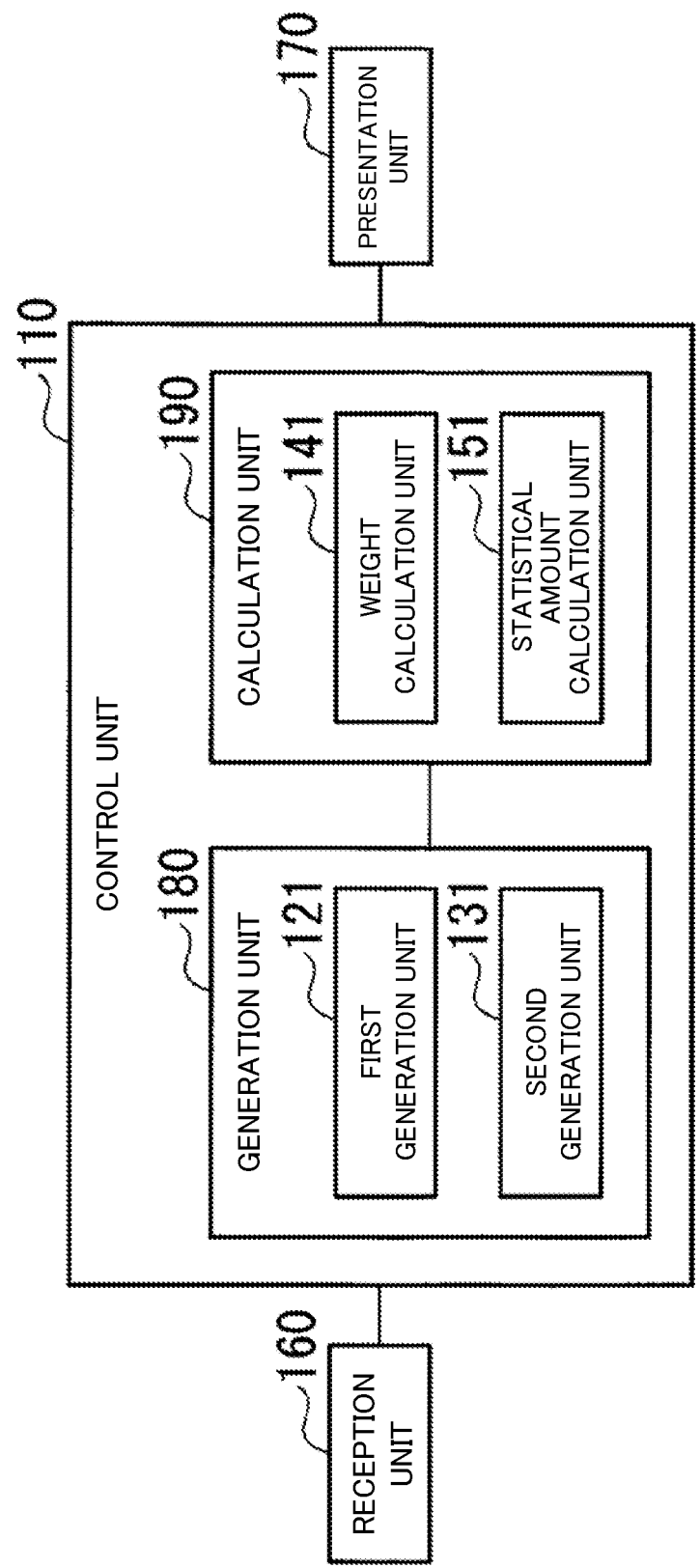
FIG. 3 is a schematic block diagram illustrating one example of a functional configuration of the signal processing device according to the first example embodiment.

FIG. 3 is a schematic block diagram illustrating one example of a functional configuration of the signal processing device 1 according to the first example embodiment.

The signal processing device 1 is configured in such a way as to include the control unit 110, the reception unit 160, and the presentation unit 170. The control unit 110 is configured in such a way as to include a generation unit 180 and a calculation unit 190. The generation unit 180 is configured in such a way as to include the first generation unit 121 and the second generation unit 131. The calculation unit 190 is configured in such a way as to include the weight calculation unit 141 and the statistical amount calculation unit 151.

The reception unit 160 receives an input from the network NW or a user. Specifically, the reception unit 160 receives, as an input, voice data of a speaker's voice and the like, or a voice feature amount. The reception unit 160 outputs the received voice data or the received voice feature amount to the control unit 110.

The control unit 110 controls a function of each unit of the signal processing device 1.

When voice data or a voice feature amount are input from the reception unit 160, the generation unit 180 generates, as a first feature vector, a short-time feature vector. Further, the generation unit 180 generates, as a second feature vector, a long-time feature vector, based on a high-order statistical vector calculated by the calculation unit 190.

More specifically, when voice data or a voice feature amount are input from the reception unit 160, the first generation unit 121 generates, as the first feature vector, the short-time feature vector for each frame (unit time). The first generation unit 121 outputs the generated first feature vector for each frame to the calculation unit 190.

Further, the second generation unit 131 generates, as the second feature vector, the long-time feature vector of a fixed dimensional number, based on a weighted average vector and a weighted standard deviation vector calculated by the calculation unit 190. The second generation unit 131 outputs the generated second feature vector to the presentation unit 170.

When the first feature vector for each frame is input from the generation unit 180, the calculation unit 190 calculates a weight for each of a plurality of the first feature vectors. Further, the calculation unit 190 calculates a high-order statistical vector, based on the first feature vector for each frame and the calculated weight.

More specifically, when a matrix in which a first feature vector for each frame is arranged for a plurality of frames is input from the first generation unit 121, the weight calculation unit 141 calculates a weight for each frame. The weight calculation unit 141 outputs the calculated weight for each frame to the statistical amount calculation unit 151.

The matrix in which the first feature vector for each frame is arranged for a plurality of frames is input from the first generation unit 121 and the weight for each frame is input from the weight calculation unit 141. Then, the statistical amount calculation unit 151 calculates, as the high-order statistical vector, the weighted average vector and the weighted standard deviation vector. The statistical amount calculation unit 151 outputs the calculated high-order statistical vector to the second generation unit 131.

When the second feature vector is input from the second generation unit 131, the presentation unit 170 performs speaker recognition, based on the second feature vector. The presentation unit 170 presents a recognition result to, for example, a user.

Note that, the presentation unit 170 may perform speaker recognition, based on voice data or a voice feature amount, and a second feature vector.

Figure 4:
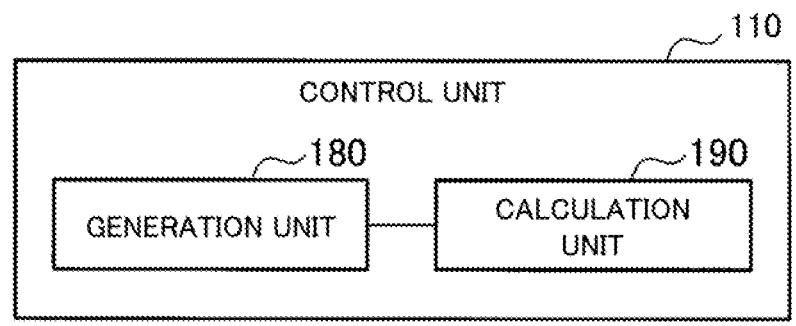
FIG. 4 is a schematic block diagram illustrating one example of a minimum configuration of the signal processing device according to the first example embodiment.

FIG. 4 is a schematic block diagram illustrating one example of a minimum configuration of the signal processing device 1 according to the first example embodiment.

The signal processing device 1 may include, as a minimum configuration, at least the generation unit 180 and the calculation unit 190, for example.

The generation unit 180 generates a first feature vector, based on any one of pieces of time-series voice data, weather data, sensor data, and text data, or a feature amount of any one of pieces of the data. Further, the generation unit 180 generates a second feature vector by using a weighted high-order statistical vector.

The calculation unit 190 calculates a weight for the first feature vector. Further, the calculation unit 190 calculates a weighted average vector and a weighted high-order statistical vector of second order or higher by using the first feature vector and the weight.

Figure 5:
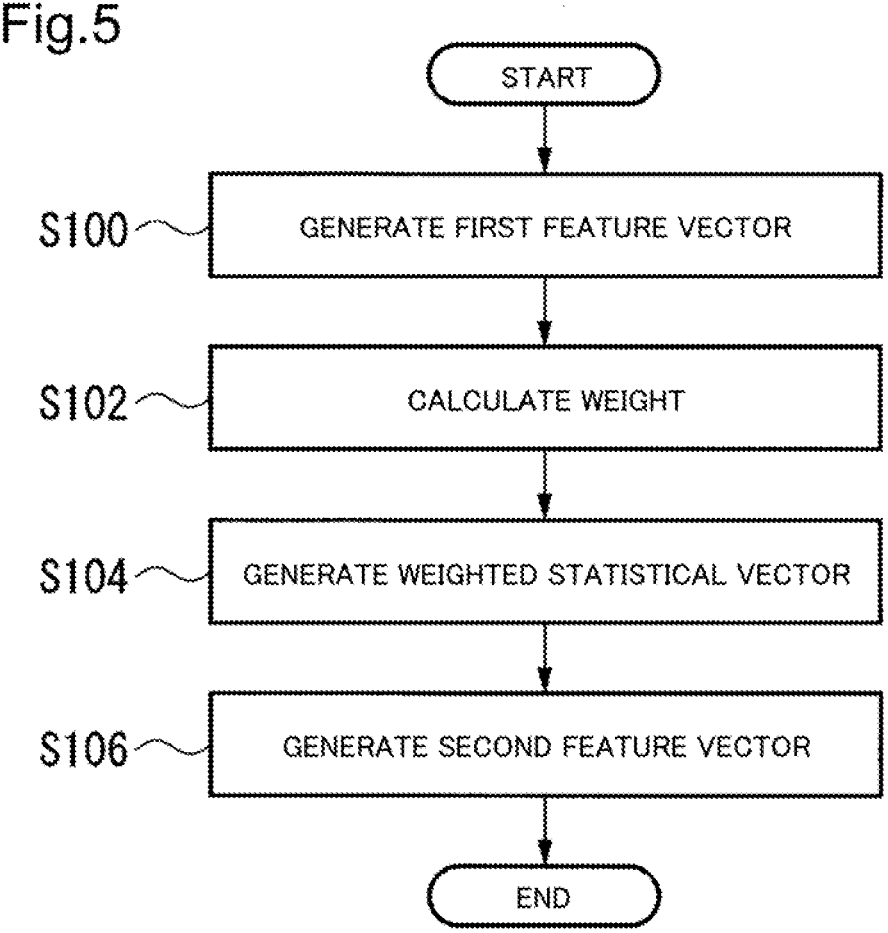
FIG. 5 is a flowchart illustrating one example of signal processing according to the first example embodiment.

FIG. 5 is a flowchart illustrating one example of signal processing according to the first example embodiment.

In step S100, when voice data or a voice feature amount are input, the first generation unit 121 generates a first feature vector. The input voice feature amount may be used by connecting 20-dimensional mel-frequency cepstral coefficients (MFCCs) or dynamic feature amounts of first or second order acquired by taking a difference of the 20-dimensional MFCCs in a time direction, or connecting voice feature amounts of a plurality of consecutive frames. Further, the voice data may preliminarily be subjected to pre-processing such as noise removal using mean-variance normalization or voice activity detection (VAD). The first feature vector generated by the first generation unit 121 may be generated by using a multi-layer perceptron, a time-delay neural network, a recurrent neural network, a conventional neural network, or the like.

In step S102, when the first feature vectors for a plurality of frames are input as a matrix, the weight calculation unit 141 calculates a weight for each of the frames. The weight calculation unit 141 calculates the weight for each of the frames by using, for example, a neural network (for example, a multi-layer perceptron) whose output is one-dimensional. Further, the weight calculation unit 141 inputs all the calculated weights for the frames to a softmax function, and thereby normalizes the weights. The weight calculation unit 141 outputs the normalized weight to the statistical amount calculation unit 151, as a weight for each of the frames.

In step S104, the statistical amount calculation unit 151 calculates, as the high-order statistical vector, the weighted average vector and the weighted standard deviation vector by using equation (1) and equation (2), based on the first feature vector and the weight.

[Math. 1]

$$\mu_i = \sum_t \alpha_t x_{ti} \quad (1)$$

$$\sigma_i = \sqrt{\sum_t \alpha_t x_{ti}^2 - \mu_i^2} \quad (2)$$

Herein, $x_{ti}$ denotes a i-th element of the first feature vector of a t-th frame, $\alpha_t$ denotes the weight of the t-th frame, and $\mu_i$ and $\sigma_i$ denote the i-th element of the weighted average and the i-th element of the weighted standard deviation, respectively.

In step S106, when the weighted average vector and the weighted standard deviation vector are input from the weight calculation unit 141, the second generation unit 131 generates a second feature vector. The second generation unit 131 generates the second feature vector by using a multi-layer perceptron, for example.

The signal processing device 1 is capable of generating a second feature vector having high class-recognition accuracy (class-identification capability) of a class, such as speaker recognition of a speaker. Further, the signal processing device 1 is capable of improving speaker-recognition accuracy by using the second feature vector generated in the above-described way, and is capable of improving convenience in performing speaker recognition.

In the present example embodiment, an example is described in which each of the first generation device 120, the second generation device 130, the weight calculation device 140, and the statistical amount calculation device 150 is configured by a separate neural network. However, these devices may be regarded as one large neural network, such as the signal processing device 1, by being connected to each other via a network.

Note that, when learning of the neural network is performed, for example, a new neural network whose nodes of an output layer are each relevant to each speaker class may be connected to the presentation unit 170. In this case, parameters held by the generation unit 180 (first generation unit 121 and the second generation unit 131) and the calculation unit 190 (weight calculation unit 141) can be learned by a back propagation method using a loss function such as a cross entropy loss.

In the present example embodiment, one example of a case in which a speaker is identified by using the second feature vector is described. However, identification may be performed on a language spoken by a speaker, a gender of a speaker, an age of a speaker, an emotion of a speaker, and the like. In this case, the presentation unit 170 may preliminarily hold a language label (model data for identifying a language), and the generation unit 180 (the first generation unit 121 and the second generation unit 131) and the calculation unit 190 (the weight calculation unit 141) may learn to minimize the loss function, based on the language label. The same applies to a gender of a speaker, an age of a speaker, an emotion of a speaker, and the like.

In the present example embodiment, one example of a case where the matrix in which first feature vectors for a plurality of frames are arranged is input to the weight calculation unit 141. However, the weight calculation unit 141 may calculate calculable weights for first feature vectors sequentially input from the first generation unit 121.

Note that, the statistical amount calculation unit 151 may calculate, instead of the weighted average vector and the weighted standard deviation vector, a variance vector being a second-order statistical amount and a weighted covariance vector indicating a correlation between different elements of the first feature vector. Further, the statistical amount calculation unit 151 may use a high-order statistical vector of third order or higher such as a weighted skewness being a third-order statistical amount or a weighted kurtosis being a fourth-order statistical amount.

In the present example embodiment, one example of a case in which voice data or a voice feature amount are used is described. However, text data of a sentence and the like, sensor data of a sensor output and the like, weather data, or a feature amount of those data may be used.

As described above, the signal processing system sys according to the present example embodiment includes: the first generation unit 121 that generates a first feature vector based on any one of pieces of time-series voice data, weather data, sensor data, and text data, or a feature amount of any one of pieces of the data; a weight calculation unit 141 that calculates a weight for the first feature vector; statistical amount calculation unit 151 that calculates a weighted average vector and a weighted high-order statistical vector of second order or higher by using the first feature vector and the weight; and the second generation unit 131 that generates a second feature vector by using the weighted high-order statistical vector.

By this configuration, it is possible to generate a first feature vector while applying a large weight to a frame that is important for identification, and therefore a second feature vector in which an important frame is taken into consideration can be generated, even for long-time voice data and the like. Consequently, accuracy of speaker-recognition using the second feature vector can be improved. Further, since it is possible to reduce a weight for a frame having less feature of a speaker (a frame that is not important), recognition accuracy can be improved. For these reasons, it is possible to improve convenience in performing speaker recognition.

Figure 6:
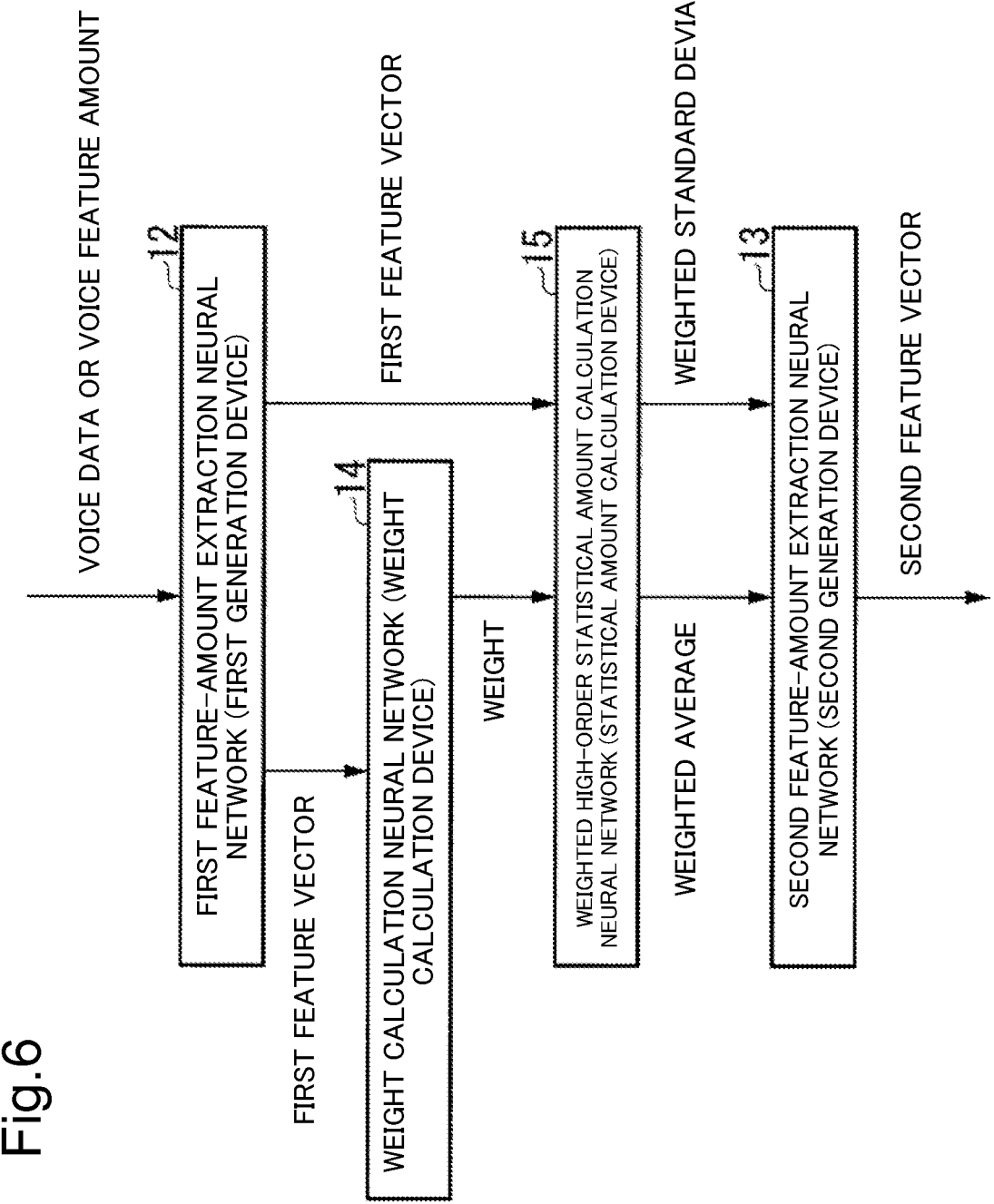
FIG. 6 is a system configuration diagram illustrating one example of a configuration of a configuration of a signal processing system according to a modification example.

FIG. 6 is a system configuration diagram illustrating one example of a configuration of a signal processing system sys1 according to a modification example.

The signal processing system sys1 is configured in such a way as to include a first feature-amount extraction neural network 12, second feature-amount extraction neural network 13, a weight calculation neural network 14, and a weighted high-order statistical amount calculation neural network 15. Each of the first feature-amount extraction neural network 12, the second feature-amount extraction neural network 13, the weight calculation neural network 14, and the weighted high-order statistical amount calculation neural network 15 is configured by a neural network. The first feature-amount extraction neural network 12, the second feature-amount extraction neural network 13, the weight calculation neural network 14, and the weighted high-order statistical amount calculation neural network 15 are connected to each other via a network NW.

Note that, the first feature-amount extraction neural network 12, the second feature-amount extraction neural network 13, the weight calculation neural network 14, and the weighted high-order statistical amount calculation neural network 15 may be configured as one neural network.

When voice data or a voice feature amount are input, the first feature-amount extraction neural network 12 generates a first feature vector similarly to the above-described first generation device 120 and the first generation unit 121. The first feature-amount extraction neural network 12 outputs the generated first feature vector to the weight calculation neural network 14. Further, the first feature-amount extraction neural network 12 outputs the generated first feature vector to the weighted high-order statistical amount calculation neural network 15. Herein, the first feature vector is, for example, a short-time feature vector.

When the first feature vector is input from the first feature-amount extraction neural network 12, the weight calculation neural network 14 calculates a weight for each first feature vector similarly to the above-described weight calculation device 140 and the weight calculation unit 141. The weight calculation neural network 14 outputs the calculated weight for each first feature vector to the weighted high-order statistical amount calculation neural network 15.

The weighted high-order statistical amount calculation neural network 15 calculates, based on the first feature vector input from the first feature-amount extraction neural network 12 and the weight input from the weight calculation neural network 14, a weighted high-order statistical amount similarly to the above-described statistical amount calculation device 150 and the statistical amount calculation unit 151. The weighted high-order statistical amount calculated by the weighted high-order statistical amount calculation neural network 15 is a weighted average and a weighted standard deviation. The weighted high-order statistical amount calculation neural network 15 outputs the calculated weighted average and the calculated weighted standard deviation to the second feature-amount extraction neural network 13.

The second feature-amount extraction neural network 13 generates, based on the weighted average and the weighted standard deviation input from the weighted high-order statistical amount calculation neural network 15, a second feature vector similarly to the above-described second generation device 130 and the second generation unit 131.

The second feature vector is, for example, a long-time feature vector of a fixed dimensional number.

The signal processing system sys1 is capable of generating a second feature vector having high capability of class-recognition such as speaker recognition. Further, the signal processing system sys1 is capable of performing speaker recognition (class recognition, class identification) by using the second feature vector generated via the neural networks. Further, speaker recognition accuracy in a case where the second feature vector is used can be improved by generating the second feature vector by using a high-order statistical amount such as the weighted average and the weighted standard deviation.

Note that, a program that operates in the signal processing device 1, the signal processing system sys, and the signal processing system sys1 according to each example embodiment and each modification example of the present invention may be a program (a program that causes a computer to function) that controls a central processing unit (CPU) and the like in such a way as to achieve a function described in the above description on each example embodiment and the modification example related to one aspect of the present invention. When being processed, information handled by each of those devices is temporarily accumulated in a random access memory (RAM), then stored in any kind of read only memory (ROM) such as a flash ROM or a hard disk drive (HDD), and is read, corrected, and written by the CPU as necessary.

Note that, a part of the signal processing device 1, the signal processing system sys, and the signal processing system sys1 according to each example embodiment and the modification example described above may be achieved by a computer. In that case, the program for achieving the control function may be recorded in a computer-readable recording medium, and the program recorded in the recording medium may achieve, by being read and executed by a computer system, a part of the signal processing device 1, the signal processing system sys, and the signal processing system sys1.

Note that, the "computer system" mentioned herein is assumed to be a computer system built in the signal processing device 1, the signal processing system sys, and the signal processing system sys1, and is assumed to include an operating system (OS) and hardware such as a peripheral device. Further, the "computer-readable recording medium" is a portable medium such as a flexible disk, a magneto-optical disk, a ROM, a compact disc (CD)-ROM, and the like, or a storage device such as a hard disk or the like built in the computer system.

Further, the "computer-readable recording medium" may include a recording medium that dynamically holds a program for a short time, such as a communication line in a case where the program is transmitted via a network such as the Internet and a communication channel such as a telephone line, and a recording medium that holds the program for a certain period of time, such as a volatile memory included in a computer system that serves as a server or a client in the above-described case. Further, the above-described program may be a program for achieving a part of the above-described function, and may be a program capable of achieving the above-described function by being combined with a program already recorded in the computer system.

Further, a part or all of the signal processing device 1, the signal processing system sys, and the signal processing system sys1 according to each example embodiment and the modification example described above may be achieved as large-scale integration (LSI), which is typically an integrated circuit, or may be achieved as a chip set. Further, each of functional blocks of the signal processing device 1, the signal processing system sys, and the signal processing system sys1 according to each example embodiment and the modification example described above may be individually made into a chip, or some or all of the functional blocks may be integrated and made into a chip. A method of forming an integrated circuit is not limited to LSI, and may be achieved by a dedicated circuit and/or a general-purpose processor. Further, when a technique for forming an integrated circuit that replaces LSI is devised as a result of progress in a semiconductor technology, an integrated circuit formed by using the technique may also be used.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application (No. 2018-048419), filed on Mar. 15, 2018, the disclosure of which is incorporated herein in its entirety by reference.

REFERENCE SIGNS LIST sys, sys1 Signal processing system
120 First generation device
130 Second generation device
140 Weight calculation device
150 Statistical amount calculation device
121 First generation unit
131 Second generation unit
141 Weight calculation unit
151 Statistical amount calculation unit
160 Reception unit
170 Presentation unit
180 Generation unit
190 Calculation unit
100 CPU
101 Storage medium interface unit
102 Storage medium
103 Input unit
104 Output unit
105 ROM
106 RAM
107 Auxiliary storage unit
108 Network interface unit
First feature-amount extraction neural network
13 Second feature-amount extraction neural network
14 Weight calculation neural network
15 Weighted high-order statistical amount calculation neural network

What is claimed is:
1. A signal processing system comprising:
at least one processor; and a memory coupled to the at least one processor and storing instructions executable by the processor to:

generate a first feature vector based on time-series voice data of a speaker, or a feature amount of the time-series voice data;

calculate a weight using the first feature vector by inputting the first feature vector to a weight calculation neural network;

calculate a weighted average vector and a weighted high-order statistical vector of second order or higher by using the first feature vector and the weight;

generate a second feature vector by using the weighted high-order statistical vector; and perform speaker recognition using the second feature vector to recognize the speaker of the time-series voice data, wherein usage of the second feature vector improves the speaker recognition.

2. The signal processing system according to claim 1, wherein the weighted high-order statistical vector is a weighted standard deviation vector or a weighted variance vector.

3. The signal processing system according to claim 1, wherein the weighted high-order statistical vector is a weighted high-order statistical vector of a third order or higher.

4. The signal processing system according to claim 1, wherein a function to generate the first feature vector, a function to calculate the weight, a function to calculate the weighted average vector and the weighted high-order statistical vector and a function to generate to the second feature vector are realized as a neural network, and are each optimized based on a single loss function.

5. The signal processing system according to claim 1, wherein a short-time feature vector of each of a plurality of times is generated as the first feature vector, the short-time feature vector having a feature of the speaker, and a long-time feature vector of a fixed dimensional number is generated as the second feature vector, the long-time feature vector having the feature of the speaker.

6. A signal processing method comprising:

generating, by a processor, a first feature vector based on time-series voice data of a speaker, and text data, or a feature amount of the time-series voice data;

calculating, by the processor, a weight using the first feature vector by inputting the first feature vector to a weight calculation neural network;

calculating, by the processor, a weighted average vector and a weighted high-order statistical vector of second order or higher by using the first feature vector and the weight;

generating, by the processor, a second feature vector by using the weighted high-order statistical vector; and performing, by the processor, speaker recognition using the second feature vector to recognize the speaker of the time-series voice data, wherein usage of the second feature vector improves the speaker recognition.

7. A non-transitory recording medium storing a program executable by a computer to execute:

generating a first feature vector based on time-series voice data of a speaker, or a feature amount of the time-series voice data;

calculating a weight using the first feature vector by inputting the first feature vector to a weight calculation neural network;

calculating a weighted average vector and a weighted high-order statistical vector of second order or higher by using the first feature vector and the weight;

generating a second feature vector by using the weighted high-order statistical vector; and performing speaker recognition using the second feature vector to recognize the speaker of the time-series voice data, wherein usage of the second feature vector improves the speaker recognition.

* * * * *